Feb. 20, 1962   R. A. BRAUNBERGER   3,022,091
KING PIN LOCK FOR FIFTH WHEELS
Filed Jan. 18, 1961
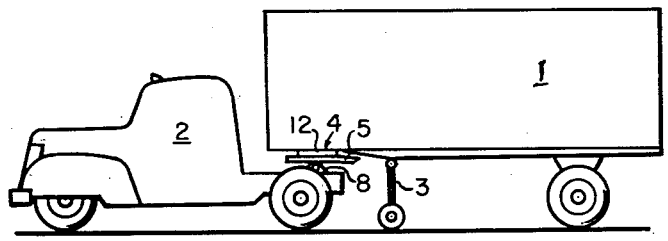
Fig. 1
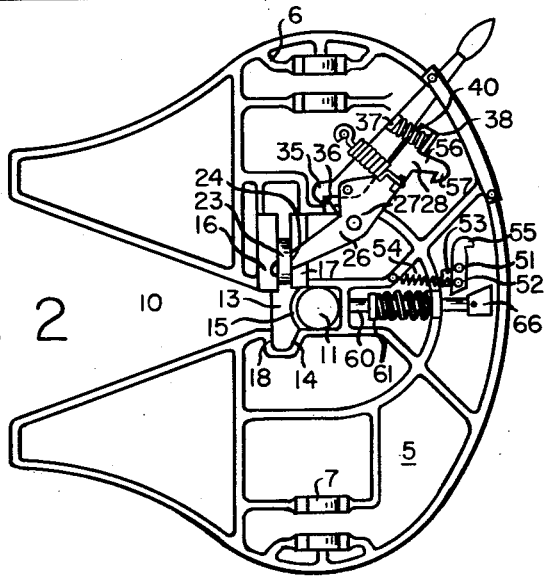
Fig. 2
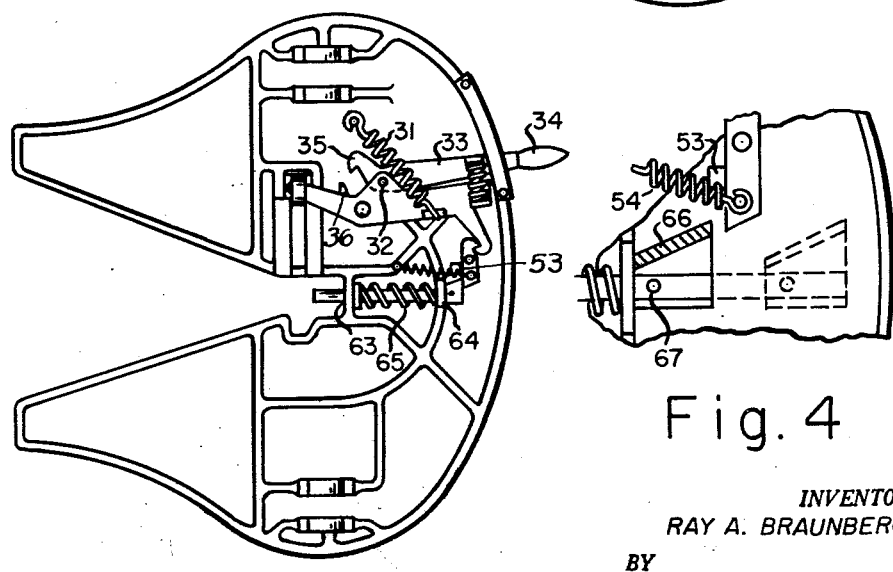
Fig. 3
Fig. 4
INVENTOR.
RAY A. BRAUNBERGER
BY Bruno G. Lechler
Attorney

3,022,091
KING PIN LOCK FOR FIFTH WHEELS
Ray A. Braunberger, 221 N. La Salle St., Chicago, Ill.
Filed Jan. 18, 1961, Ser. No. 83,592
5 Claims. (Cl. 280—434)

The invention relates to the means carried by the fifth wheel on a tractor to hold the king pin of a semi-trailer engaged after it has entered the slot in the fifth wheel, and mechanism cocked by the driver in preparation for the picking up of a semi-trailer by the tractor which releases the king pin engaging means.

When the king pin of a semi-trailer enters the slot of the fifth wheel it engages a feeler or tripper that releases the cocked mechanism that held a bolt out of the path of the king pin during entry of the king pin into the slot. When the cocked mechanism is released a spring carries the bolt into locking position and the hand lever engages an abutment that prevents the hand lever or the bolt accidently moving out of locked position while the tractor is pulling the semi-trailer.

Only when the driver moves the hand lever, is the engagement with the abutment broken and the bolt moved into disengaged position. When this is done, a mechanism is cocked to hold the bolt in its released position.

One of the features of the invention is that the feeler carries a hinged finger that permits the feeler, when engaged by the king pin, to trip the cocking mechanism, but when the mechanism has been cocked by manual operation of the handle, and the feeler subsequently moves away from the position that releases the cocking mechanism on entry of the king pin, the cocking mechanism is not tripped.

FIGURE 1 shows a semi-trailer hitched to a tractor equipped with the invention.

FIGURE 2 is a bottom view of the fifth wheel plate shown in FIGURE 1, drawn to an enlarged scale, showing the king pin of the semi-trailer locked in place for movement of the semi-trailer along the highway.

FIGURE 3 is a similar bottom view of the fifth wheel plate after the king pin has been withdrawn and the mechanism cocked ready for release by the entry of the king pin of another trailer to be picked up.

FIGURE 4 shows a portion of the under side of the fifth wheel in FIGURE 3 drawn to an enlarged scale.

In FIGURE 1, a semi-trailer 1 is shown hitched to a tractor 2. The semi-trailer carries a hinged frame 3 to support the front end of the semi-trailer while the tractor is being hitched to the semi-trailer. The fifth wheel, generally indicated at 4, includes a plate 12 and has a downwardly extending king pin 11. As the truck makes a turn, one plate will slide over the other one. Ribs 6 on the underside of the fifth wheel plate 5 carry bearings 7 on which the fifth wheel plate is supported and on which the fifth wheel plate is free to rock.

The pull of the tractor is transmitted through bearings 7 to the fifth wheel plate and from the fifth wheel plate to the king pin 11 of the semi-trailer by a bolt 13 that can slide into locked position, guided by the flanges 16, 17. The bolt may have a tapered edge 14 and this may have an arcuate recess 15 conforming to the shape of king pin 11. The forward end of the bolt may be tapered which will tend to move the bolt into firmer engagement with the king pin after the tapered portion has entered recess 18.

The bolt 13 can move to the position shown in FIGURE 3 where the bolt is completely withdrawn from the slot in the fifth wheel plate 5. The bolt 13 also carries a downwardly extending portion 23 having a horizontal opening 24.

An arm 26 is pivoted on the underside of the fifth wheel plate at 27 and extends into opening 24. This arm 26 is part of a bell crank 28. It will be seen that by turning the bell crank lever about its axis 27 the bolt can be moved from the position shown in FIGURE 2 to that shown in FIGURE 3. The bell crank 28 also carries a pivot 32. Lever 33 is mounted on this pivot. The lever 33 carries handle 34 and has a tip 35 that engages an abutment 36 carried by the plate 5. Two abutments 37, 38 are provided on the lever 33 and the bell crank 28 respectively, and a compression spring 40 tends to separate these abutments.

A tension spring 31 whose ends are respectively attached to the underside of the fifth wheel plate 5 and to bell crank lever 28 tends to draw the bell crank lever counterclockwise, as viewed in FIGURE 3, thus tending to move bolt 13 into locked position. No jolt that might break the spring 31 can release the tip 35 from 36, because the bell crank 28 and the bolt 13 are locked against accidental release.

The only way that the bolt 13 can be unlocked is by the operator grasping handle 34, moving the handle about pin 32 against compression spring 40 to unlock tip 35 and then continuing to move the handle 34 and the bell crank lever 28 about pin 27 to move the bolt to the position in FIGURE 3.

When that position is reached, the end 55 of latch 52 engages projection 57 and holds the bolt 13 in the open position. The tractor can now back away from the trailer. The latch 52 is pivoted at 51 on the plate 5.

Hinged on a pivot 51, the latch 52 is normally drawn against a stop 53 by spring 54. The crank lever 28 carries an arm 56 having an end 57 that engages the latch.

When a semi-trailer is to be unhitched, the driver of the tractor grasps handle 34 and moves the arm 33 from the position in FIGURE 2 to that shown in FIGURE 3.

It is desired to have the bolt 13 move from the position shown in FIGURE 3 to that shown in FIGURE 2 under the power of spring 31 as soon as the king pin 11 of a trailer enters the slot 10 in the plate.

When the driver of a tractor moves lever 33 from the position shown in FIGURE 2, a number of things happen in planned sequence. First spring 40 is compressed as lever 33 rotates slightly about bolt 32. That lifts finger 35 out of engagement with abutment 36. The lever 33, through abutments 37, 38 and spring 40, now swings bell crank lever 28 about axis 27 and arm 26 draws bolt 13 from the position shown in FIGURE 2 to that shown in FIGURE 3. As this movement is completed, end 57 of arm 56 engages end 55 of lever 52 which holds the parts described in the position shown in FIGURE 3 except that feeler 60 is in the position shown in full lines in FIGURE 2 and in dotted lines in FIGURE 4.

Feeler 60 consists of a tripper rod carrying an abutment 61. The feeler is guided in openings 63 and 64 in the ribs on the underside of the fifth wheel 5. A spring 65 in compression, between abutment 61 and the rib having opening 64, forces the end of the feeler against king pin 11 in FIGURE 2.

After the bolt 13 has been withdrawn, the driver locks the semi-trailer against movement and moves the tractor, which causes pin 11 to move away from the feeler 60. At its other end feeler 60 carries a finger 66 hinged at 67.

The spring 65, when the pin 11 moves out, causes the feeler to move to position shown in full lines in FIGURES 3 and 4. The hinged finger 66 swings back as it passes from the dotted position in FIGURE 4 past the end of lever 52 to the full line position shown in FIGURE 4, without disturbing lever 52 and then, as the finger engages the rib containing the opening 64, it assumes the extended position shown.

When the tractor is to be hitched to another semi-trailer and the tractor backs up toward the semi-trailer the king pin 11 of that trailer enters the slot, passes bolt 13 and engages feeler 60. As feeler 60 is pushed back, finger 66 engages latch 52. As latch 52 is rocked, it disengages from arm 56 in FIGURE 3 and the spring 31 now moves bell crank lever 28 which in turn moves the bolt 13 to the king pin-locked-position shown in FIGURE 2. The finger 35 of lever 33 engages abutment 36 and the king pin is now locked in place.

I claim:

1. A fifth wheel having a device for locking in place the king pin of a semi-trailer having, in combination, a fifth wheel plate, a slot in said fifth wheel plate into which a king pin can enter, a king pin on a semi-trailer, a bolt movable in the fifth wheel plate to obstruct said slot to prevent said king pin from leaving the slot, a hand lever carried by said fifth wheel for withdrawing the bolt from said slot, means normally biased to hold the bolt in slot-obstructing position, a latch carried by the fifth wheel plate which engages said hand lever when the lever has withdrawn the bolt, a tripper for releasing said latch comprising an axially movable rod carried by said fifth wheel plate which engages a king pin when in the slot, means biasing the rod to move axially forward when the king pin moves out of the slot, a finger hinged on said rod which passes said latch without tripping it when the rod moves forward but trips the latch when another king pin enters the slot and moves the rod in reverse direction thus allowing the bolt to move to its biased slot obstructing position.

2. A fifth wheel having, in combination, a slot into which the king pin of a semi-trailer has entered, a bolt sliding in guides in said fifth wheel obstructing said slot to prevent the king pin from leaving the slot, a hand lever carried by said fifth wheel adapted to move said bolt, a spring biasing said hand lever to move said hand lever to move said bolt into slot-obstructing position, a latch engaged by the lever when it has moved the bolt into non-obstructing position, a tripper rod carried by the fifth wheel, a spring forcing said tripper rod against said king pin, a finger hinged on said tripper rod beyond said latch which passes said latch without tripping it when the tripper rod follows an outgoing king pin but trips said latch when another king pin enters the slot and engages said tripper rod whereupon the spring biasing said hand lever moves it to a position where the bolt obstructs said slot.

3. A fifth wheel having, in combination, a slot into which the king pin of a semi-trailer has entered, a bolt sliding in guides in said fifth wheel obstructing said slot to prevent the king pin from leaving the slot, a bell crank carried by said fifth wheel adapted to move said bolt, a hand lever carried by said bell crank, abutments on said bell crank engaging said hand lever so that after limited relative angular movement the hand lever moves the bell crank lever, an abutment on said fifth wheel engaged by said hand lever, a spring biasing the hand lever into engagement with said abutment and forcing the bell crank lever through said abutments to move the bolts into slot obstructing position, a latch carried by said fifth wheel engaged by said lever when the lever has moved to disengage said abutment and to move said bell crank to draw the bolt into non-obstructing position, a tripper rod carried by the fifth wheel, a spring forcing said tripper rod against said king pin, a finger hinged on said tripper rod which passes said latch without tripping it when the king pin moves out of the slot allowing the spring to move said tripper rod but which trips said latch when another king pin enters the slot and engages said tripper rod whereupon the spring biasing said hand lever moves it to a position where the bolt obstructs said slot.

4. A bolt releasing mechanism in a fifth wheel having a lever which when moved in one direction first releases a bolt lock and then moves the bolt, comprising, in combination, a fifth wheel, a bolt slidable on said fifth wheel, a fixed abutment on said fifth wheel, a bell crank lever pivoted on said fifth wheel and engaging said bolt, a spring biasing said bell crank into position to engage said bolt, a lever pivoted on said bell crank lever normally engaging said fixed abutment to prevent movement of the bell crank lever and bolt, a stop on said bell crank lever engaged by said lever after it has been moved to disengage the lever from said abutment whereby further movement of the lever turns the bell crank lever about its support to move the bolt, a latch which holds the lever that is engaged by said lever when the bolt has been moved, a feeler moved by a king pin entering a slot in said fifth wheel which trips said latch allowing said spring to move the bell crank and the bolt and causing the lever to engage said abutment.

5. In a fifth wheel as described in claim 3, an axially movable feeler which passes through a rib on said fifth wheel, a finger hinged on the feeler which engages said rib when said spring moves the feeler axially into a position ready for engagement by a king pin entering the fifth wheel, said engagement of the finger and the rib placing the finger in the proper angular position for engagement with said latch when the feeler is moved.

References Cited in the file of this patent

UNITED STATES PATENTS

| | | |
|---|---|---|
| 2,142,748 | Fontaine | Jan. 3, 1939 |
| 2,431,779 | Stevens | Dec. 2, 1947 |
| 2,736,574 | Braunberger | Feb. 28, 1956 |
| 2,977,137 | Durham | Mar. 28, 1961 |